Dec. 25, 1951   R. W. OLSON   2,579,852
MULTIPLE RECORDER
Filed Oct. 17, 1949   2 SHEETS—SHEET 1
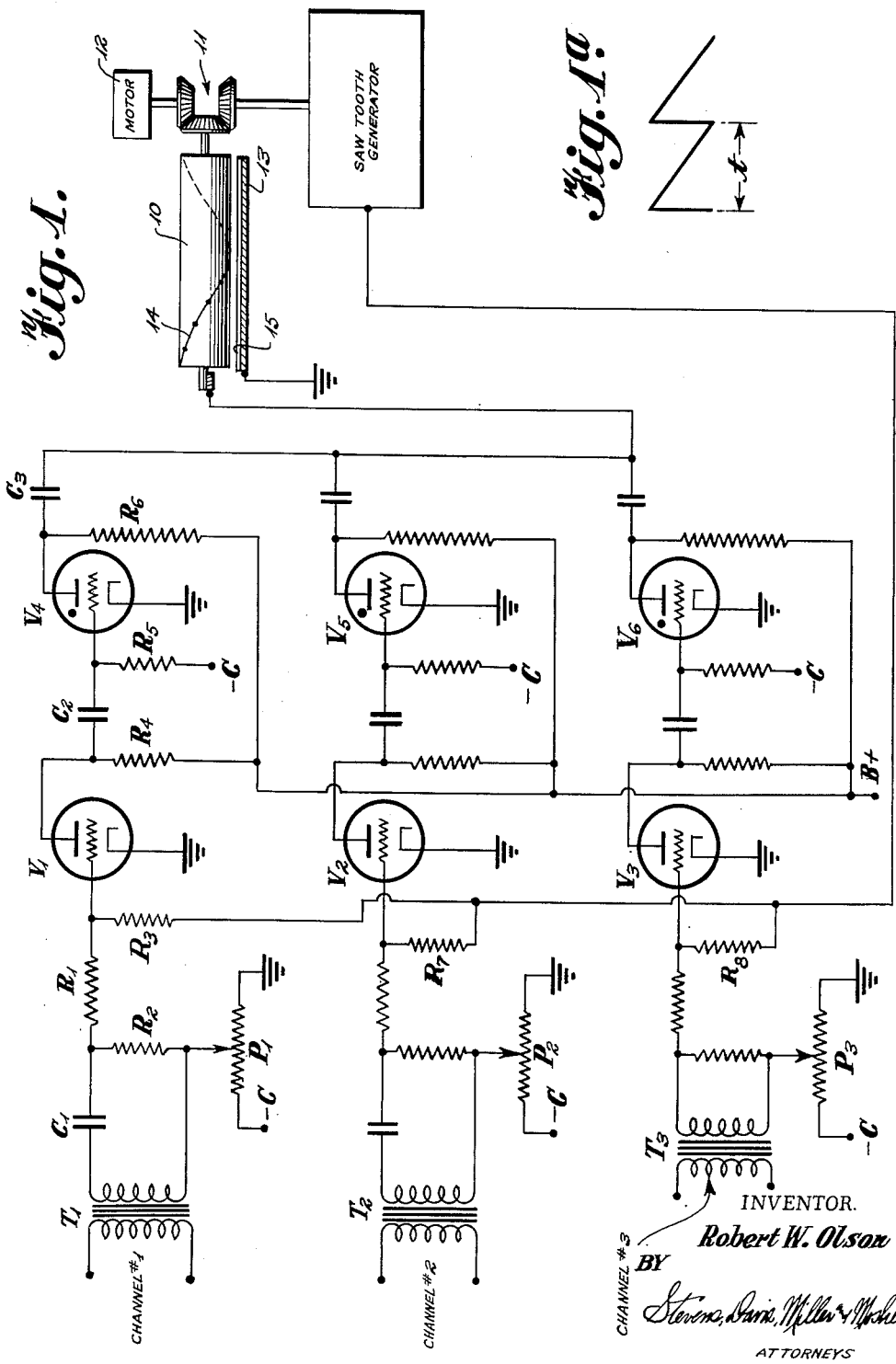
INVENTOR.
Robert W. Olson
BY
Stevens, Davis, Miller & Mosher
ATTORNEYS

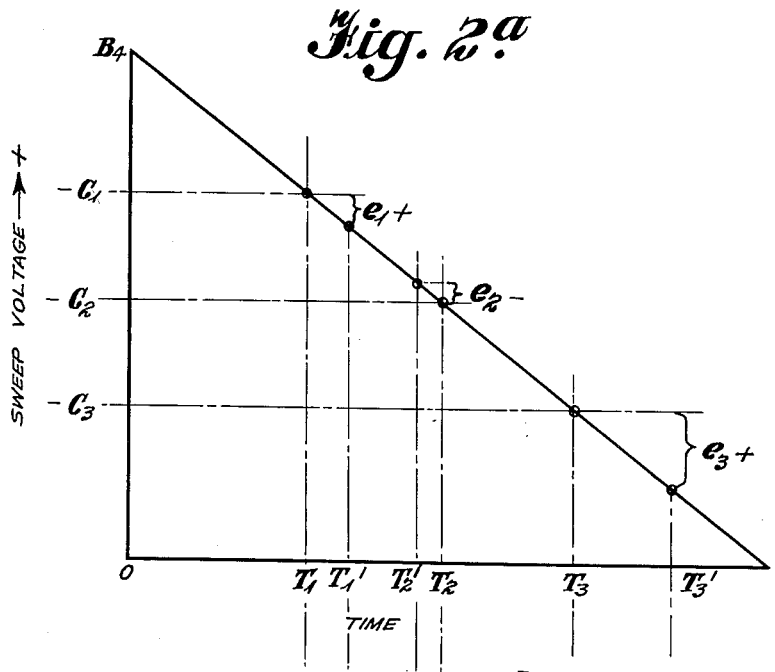

UNITED STATES PATENT OFFICE 2,579,852

MULTIPLE RECORDER

Robert W. Olson, Dallas, Tex., assignor to General Instruments Inc., a corporation of Delaware Application October 17, 1949, Serial No. 121,727

6 Claims. (Cl. 346—34)

This invention relates to a method and apparatus for separately, but substantially continuously, recording information from a plurality of sources, and more particularly to a method and apparatus for producing an immediately available record of the information from the said plurality of sources.

In numerous instances it is desirable to record on a single record a plurality of traces that are indicative of the variations in amplitude of a plurality of electrical signals. These signals, in turn, vary in amplitude in accordance with variations in the information producing them.

A particular example of such a system is found in seismic surveying. In seismic surveying the waves propagated through the earth's strata are detected by a series of electronic devices, and the electrical signals therefrom separately amplified and recorded as a series of side-by-side traces on a strip of recording paper. The particular means used to produce this multiple record has taken a number of different forms, all of which for one reason or another have been found to be unsatisfactory. One means includes a series of string or mirror galvanometers actuated from the detectors or seismometers to produce on a single photosensitive paper a series of traces indicative of the signals detected. Two major disadvantages inherent in this system considerably limit its practical use. First, galvanometers are extremely sensitive and delicate instruments incapable of withstanding rugged treatment. Second, the photosensitive paper requires the additional step of development which necessitates developing facilities and introduces a time lag of considerable amount between the actual recording of the signals and the time when the record is available.

Another means of simultaneously recording a plurality of signals includes a plurality of recording pens which trace on a paper the indications of the variations in the detected signals. Such a means is also subject to two main disadvantages. First, the inertia of the pens and of their associated mechanical actuating elements make this a sluggish and insensitive arrangement not capable of accurately recording low amplitude signals nor even correctly recording within a small degree of tolerance high amplitude signals. Second, the pens are incapable of recording signals whose amplitudes are high enough to force the traces of adjacent pens to cross or approach in close proximity to one another.

It has been suggested that a single signal be recorded in a continuous fashion and in such a manner to produce an immediately available record, by the use of a facsimile recorder operating on electrosensitive paper (see U. S. Patent No. 2,434,531 to Wilson et al.). No means has heretofore been developed for adapting this arrangement for use in recording a plurality of such signals.

It is, accordingly, an object of this invention to provide an electronic system for recording substantially simultaneously a plurality of electrical signals and making the record continuously and immediately available for analysis, which system is far more efficient than those heretofore available.

It is another object of this invention to provide a recording system which reduces to a minimum the time lag between the introduction of the plurality of signals to be recorded and the final manifestation of the amplitude of these signals or visible traces on a single record strip.

Broadly, this invention relates to a device for recording electric signals comprising an electronic circuit including a vacuum tube amplifier normally biased to cut off, means to introduce into said vacuum tube amplifier the said signals to be recorded to change the bias of said amplifier, a saw-tooth voltage generator for generating a saw-tooth voltage, said voltage being electrically connected to said vacuum tube amplifier to unbias said amplifier during the upsweep of said saw-tooth voltage and to bias the said amplifier to cut off at some time during the downsweep of said saw-tooth voltage, said time being determined by the algebraic sum of said saw-tooth voltage, the normal bias of said amplifier and the presence therein of said electric signals to be recorded, a gas tube connected to said amplifier and biased to fire only when said amplifier is cut off, and means for recording the time of the firing of said gas tube in relation to the period of the said sweep voltage as an indication of the amplitude of the signals to be recorded.

Other and further objects of this invention will be apparent from a more detailed description of the accompanying drawings.

Figure 1 is a circuit diagram of the electronic circuits comprising the input signal channels and shown in relation to the recording network which is in this figure illustrated in plan view;

Figure 1a is a wave form of the saw-tooth voltage generated by the saw-tooth generator shown in Figure 1;

Figure 2 is a graphic illustration of the saw-tooth wave in relation to time; and Figure 2a is a plan view of the recording paper mounted on rollers and showing the spots impressed thereon by the operation of the electronic circuit and recording networks.

Referring now to Figure 1, it will be noted that there are three input signal channels whose outputs are connected through a single conductor to a rotating helix. With particular reference to channel 1, which is representative of the other channels, the input signal is introduced onto the primary of the transformer $T_1$ and induced into the secondary thereof. The input signal appearing on the secondary of $T_1$ is introduced onto the grid of the electronic vacuum tube $V_1$ through the grid condenser $C_1$ and the grid resistor $R_1$. The bias voltage supply for the electronic vacuum tube $V_1$ is supplied by any suitable D. C. source indicated in this figure by legend $-C$. This bias voltage source supplies the bias voltage for all of the electronic vacuum tubes in the entire circuit. The bias voltage appearing on the electronic vacuum tube $V_1$ is determined by the setting of the resistance potentiometer $P_1$. Modulating the bias on the tube $V_1$ is a saw-tooth wave supplied by the saw-tooth generator, indicated in this figure diagrammatically, and introduced to the grid of $V_1$ through resistance $R_3$ and in the same manner to tubes $V_2$ and $V_3$ through resistances $R_7$ and $R_8$. The bias of the tube $V_1$ is so set that in the absence of any saw-tooth voltage modulating the bias therein, the tube $V_1$ will be operating at or below cut-off. This, of course, means that normally the plate voltage of the tube $V_1$ will be equal to the D. C. plate supply voltage introduced to the plate of $V_1$ through the resistance $R_4$ from any suitable plate voltage supply indicated in this figure by legend $B+$. This $B+$ voltage source supplies the plate voltage for all the tubes in the circuit.

On the upsweep of the saw-tooth voltage, the grid of the tube $V_1$ is of such a positive voltage that $V_1$ is passing a maximum amount of plate current, or, in other words, the tube is saturated. The plate voltage of the tube $V_1$ is very low. This low plate voltage acting through grid condenser $C_2$ controls the bias on gas tube $V_4$. This gas tube $V_4$ is normally operating below cut-off by virtue of the grid voltage supplied thereto by the grid voltage supply $-C$ through grid resistor $R_5$.

As long as the vacuum tube $V_1$ passes current, the bias of the tube $V_4$ will be of such a negative value as to prevent the gas tube $V_4$ from firing. As the saw-tooth wave voltage, applied to the grid of $V_1$, decreases on its downsweep, the net grid voltage passes through zero and finally to cut-off. When the tube $V_1$ is cut off by the action of the signal in the primary of $T_1$ and the saw-tooth wave in conjunction with the bias voltage supplied by the bias voltage source $-C$ through resistance potentiometer $P_1$, the plate voltage of the tube $V_1$ increases to a value equal to $B+$, thus causing the grid of the gas tube $V_4$ to swing to a positive potential. This fires the gas tube $V_4$, causing current to flow through the plate resistor $R_6$ of the tube $V_4$. This change in potential of the plate of $V_4$ is introduced through the condenser $C_3$ onto the helix 10. The operation of channel 1 is identical to the operation of the other channels. The only operational difference is due to the bias potential of the tubes $V_1$, $V_2$ and $V_3$ as will be explained later.

The operation of the helix is conventional. The rotation of the helix is produced by the rotation of the bevel gears 11. The gears are caused to rotate by the motor 12.

Placed between the helix 10 and the grounded plate 13 is a roll of electrolytic recording paper 15 of the conventional type. This paper is caused to move between the helix and the metal rod 13 by motor driven rollers of any suitable type such as shown diagrammatically in Figure 2b. When the gas tube $V_4$ fires and introduces an electric potential to the helix cord 14 of the helix 10, the difference of potential established between the helix cord 14 and the grounded rod 13 will cause a current to flow therebetween, which will leave an indication on the electrolytic recording paper 15. The current will flow between the helix cord 14 and the grounded rod 13 at a position on the recording paper 15 determined by the proximity of the cord 14 with the grounded rod 13. This is the usual operational manner of a helix and is well understood by one skilled in the art.

The motor 12, operating through the bevel gears 11, which are all arranged in 1:1 ratio, determines the repetition frequency of the saw-tooth wave generated by the saw-tooth generator. As is shown in Figure 1a, the period of the saw-tooth wave $t$ is equal to the time required for one complete rotation of the helix 10.

The coordination of the electronic circuit with the helix, motor, bevel gears and saw-tooth generator will be better explained with reference to Figures 2a and 2b. It suffices at this time to note that the bias established in the tubes $V_1$, $V_2$ and $V_3$ is determined by the setting of the resistance potentiometers $P_1$, $P_2$ and $P_3$. They are set so as to cause the tubes $V_1$, $V_2$ and $V_3$ to reach a cut-off voltage in the absence of any introduced signal at different times and at different values of sweep voltage. For purposes of discussion with reference to Figures 2a and 2b, it is assumed that $V_3$ is more positively biased with reference to the other two tubes, and $V_1$ more negatively biased with reference to the other two tubes. This arrangement may be varied as desired.

Referring to Figure 2a, the sweep voltage illustrated graphically with reference to time reaches a value on its upsweep indicated arbitrarily as $B_4$. At this time, tubes $V_1$, $V_2$ and $V_3$ are saturated. The gas tubes $V_4$, $V_5$ and $V_6$ are cut off. As the sweep voltage decreases with time, it ultimately passes through the cut-off voltage of the tube $V_1$, designated in this figure as $-C_1$ and occurring at time $T_1$. At this time $T_1$, the vacuum tube $V_4$ fires and introduces an electric potential to the helix 10 which causes current flow between the helix cord 14 and the grounded rod 13 and a resulting iron deposit appears on the electrolytic recording paper as shown in Figure 2b at position $S_1$.

As the sweep voltage decreases to a value equal to the cut-off voltage of tube $V_2$, designated in this figure as $-C_2$, at time $T_2$, a current will cause a recording on the electrolytic paper designated in Figure 2b as $S_2$. As the sweep voltage decreases still further, it passes through the cut-off voltage of tube $V_3$, which cut-off voltage is designated here as $-C_3$, at time $T_3$, and causes a recording on the electrolytic paper designated as $S_3$ in Figure 2b.

Now, if we assume that three signals are present simultaneously in the input channels 1, 2 and 3, at time $T_1$, the input signal to channel 1, designated as $e_1+$, will prevent, because it is positive with respect to $-C_1$, the tube $V_1$ from cutting off at $T_1$. Instead, it will cut off at some time later, designated here as $T_1'$. At this time the helix cord will have rotated slightly more than it had at time $T_1$ and current flow will cause an indication on the electrolytic recording paper at position $S_1'$ in Figure 2b.

If the signal introduced into channel 2 is negative with respect to the normal bias $-C_2$ of the tube $V_2$, the tube $V_2$ will cut off at some time earlier than time $T_2$, designated here as $T_2'$. This will cause an indication on the electrolytic recording paper designated as $S_2'$ in Figure 2b.

If the signal introduced into signal channel 3 is positive with respect to the normal bias $-C_3$ of the tube $V_3$, the tube will be cut off at some time later than time $T_3$, designated here as time $T_3'$, and will cause an indication on the electrolytic recording paper indicated in Figure 2b as $S_3'$.

It is, therefore, evident that the amplitude of the signals introduced into any of the input signal channels will determine the time at which the gas tubes fire, and consequently the position of the indication on the electrolytic recording paper. The position of the indications are in relation to the no signal indications as indicated in Figure 2b by $S_1$, $S_2$ and $S_3$, directly proportional to the amplitude of these input signals. It should be noted that it is possible, by applying a large enough signal voltage, to cause any one of the tubes to fire at any time on the paper or even off the paper, and that the traces can be caused to cross and recross one another in the same way and with the same freedom that could be achieved with completely independent galvanometers. It is merely necessary, for example, for the signal voltage on the first trace to be higher than the difference in bias between it and the adjacent trace for the indication generated by the first trace to be in a position beyond the indication generated by the second. Indeed, it is perfectly possible for any of the traces to put a spot anywhere on the paper. Then, too, by controlling the speed of rotation of the helix, and the movement of the electrolytic paper, the indications can be placed very close to one another to produce the appearance of a continuous trace. It is also important to note that any one of the traces may be identified with any one of the channels by correlation. For example, it may be accomplished by moving the bias knob which is located on the front panel of the recorder, which bias knob is connected to the potentiometer controlling the grid bias of the vacuum tube amplifier in the channel. By changing the position of this bias knob, the trace coming from this particular channel may be moved to either side of the recording paper, thus identifying the bias knob and its particular channel with the trace on the recording paper. In practice, the input terminal to a particular trace and the bias control are arranged on the front panel of the recorder in such a way that the relationship would be perfectly obvious. Then if one wished to determine which trace was which he would merely turn the bias knob and thus move the trace back and forth across the paper.

The frequency response of the device depends on the total number of picture elements per unit of time and on the resolution of size of the dots. These two factors depend, in turn, upon the paper's speed of movement and the rotational speed of the helix, mechanical design and a few other considerations of decreasing importance.

The accuracy with which the device indicates depends only on the stability and perfection of the saw-tooth wave which pulses the circuit. If this wave is delivered to the grids of the individual circuits at the same amplitude and in the same shape for every cycle, the device will be perfectly stable. If the peak amplitude of the saw-tooth wave is constant, the calibration of the device will be constant. It should be noted that the particular means of generating the saw-tooth voltage is not critical. It is only important that the repetition frequency of the saw-tooth wave be equal to the time for one complete rotation of the helix. This can be accomplished in any conventional manner, such as driving through the worm gears a rotating resistance potentiometer.

What has been shown is a particular embodiment of this invention, including a helix arrangement for the impression of the indications on the electrolytic recording paper. It is contemplated that another embodiment of this invention, including a television head, may be used. In such an arrangement, the same sweep voltage that is applied to the grids of the tubes $V_1$, $V_2$ and $V_3$ is supplied to the horizontal plates of the cathode ray tube in the television head. The output of the signal channels is impressed on the bias grid of the cathode ray tube.

Another embodiment of this invention includes the use of a multiple helix or similar device to increase the available rate of scan. This embodiment is obvious to one skilled in the art from the teachings of this invention.

It should be noted that the particular embodiment herein disclosed includes three input signal channels. One or any number of channels may be used. It is also important to note that the types of tubes and the particular values of condensers and resistors in the electronic circuit are not critical. It is only important that the tubes $V_1$, $V_2$ and $V_3$ be of the conventional amplifier vacuum tube type, but preferably very high gain tubes such that the difference of a volt or so would be the difference between conducting and cut-off, and the tubes $V_4$, $V_5$ and $V_6$ be of the conventional gas tube type and that the resistors and condensers be of substantially equal values in each of the signal channels. Although the value of resistors and condensers in each channel is not particularly critical, that is, large tolerances may be allowed and successful operation still obtained, it has, nevertheless, been found that preferably the grid resistors in tubes $V_1$, $V_2$ and $V_3$ should be rather high. Being large, when a relatively high grid signal is present, a large proportion of the signal will be consumed by the resistor and the tube, being saturated at the time, will not draw very much more current. This, to a large extent, increases the range of operation of the circuit.

What is claimed is:

1. In a device for recording electric signals, an electronic circuit including a vacuum tube amplifier normally biased to cut off, means to introduce into said vacuum tube amplifier the said signals to be recorded to change the bias of said amplifier, a saw-tooth voltage generator for generating a saw-tooth voltage, means to regulate the voltage of said saw-tooth generator so that it passes through the bias voltage of said vacuum tube amplifier during its upsweep to unbias said vacuum tube amplifier and through the bias voltage of said vacuum tube amplifier during its downsweep to bias said vacuum tube amplifier again to cutoff, the time of the unbiasing and the biasing of the vacuum tube amplifier being determined by the algebraic sum of said saw-tooth voltage, the normal bias of said amplifier and the presence therein of said electric signals to be recorded, means to electrically connect said voltage to said vacuum tube amplifier, a gas tube connected to said amplifier and biased to fire only when said amplifier is cut off, and means for recording the time of the firing of said gas tube in relation to the period of the said sweep voltage as an indication of the amplitude of the signals to be recorded.

2. In a device for recording electric signals, an electronic circuit including a vacuum tube amplifier normally biased to cut off, means to introduce into said amplifier the signals to be recorded to change the bias of said amplifier, a voltage generator for generating a voltage whose amplitude varies with time, means to regulate the voltage of said voltage generator so that it passes through the bias voltage of said vacuum tube amplifier during its upsweep to unbias said vacuum tube amplifier and through the bias voltage of said vacuum tube amplifier during its downsweep to bias said vacuum tube amplifier to cutoff, the time of the unbiasing and biasing of said vacuum tube amplifier being determined by the algebraic sum of said time varying voltage, the normal bias voltage of said amplifier and the voltage of the signals to be recorded, means to electrically connect said voltage to said vacuum tube amplifier, a gas tube connected to said amplifier and biased to fire only when said amplifier is cut off, and means for recording the time of the firing of said gas tube in relation to the period of the said time varying voltage as an indication of the amplitude of the signals to be recorded.

3. In a device for recording electric signals, an electronic circuit including a vacuum tube amplifier normally biased to cut off, means to introduce the said signals to be recorded so as to change the bias of said amplifier, a saw-tooth voltage generator for generating a saw-tooth voltage, means to regulate the voltage of said saw-tooth generator so that it passes through the bias voltage of said vacuum tube amplifier during its upsweep to unbias said vacuum tube amplifier and through the bias voltage of said vacuum tube amplifier during its downsweep to bias said vacuum tube amplifier again to cutoff, the time of the unbiasing and the biasing of the vacuum tube amplifier being determined by the algebraic sum of said saw-tooth voltage, the normal bias of said vacuum tube amplifier and the presence therein of electric signals to be recorded, a gas tube connected to said amplifier and biased to fire only when said amplifier is cut off, a rotating voltage recording means, means for impressing the said electric signals upon the said rotating voltage recording means at a time determined by the firing of the said gas tube, means for synchronizing the rotation of said voltage recording means with the period of the said saw-tooth voltage so that the electric signals to be recorded are displaced across said rotating recording means as a function of the voltage of the electric signals to be recorded.

4. In a device for recording a plurality of electric signals, an electronic circuit including a plurality of input signal channels for the introduction therein of signals to be recorded, a vacuum tube amplifier in each of said signal channels, each of said tubes being normally biased to cut off but in different voltage amounts, means to introduce said signals to be recorded into said signal channels to change the normal bias in each of said amplifier tubes, a saw-tooth voltage generator for generating a saw-tooth voltage, means to regulate the sweeping voltage of said saw-tooth generator so that it passes through the bias voltage of each of said vacuum tube amplifiers during its upsweep to unbias at different times each of said vacuum tube amplifiers and again through the bias voltage of each of said vacuum tube amplifiers during its downsweep to bias at different times each of said vacuum tube amplifiers to cutoff, the time of the unbiasing and biasing of said vacuum tube amplifiers being determined by the algebraic sum of said saw-tooth voltage, the normal bias of each amplifier tube and the amplitude of the electric signals to be recorded present therein, means to electrically connect said voltage to each of said vacuum tube amplifiers, a gas tube connected to each of said amplifiers and biased to fire only when the amplifier tube to which it is connected is cut off, and means to record the time of the firing of each of said gas tubes in relation to the period of the said saw-tooth voltage as an indication of the amplitude of the signals to be recorded.

5. In a device for recording a plurality of electric signals, an electronic circuit including a plurality of input signal channels for the introduction therein of the signals to be recorded, a vacuum tube amplifier in each of said signal channels, each of said tubes being normally biased to cut off but in different voltage amounts, means to introduce said signals to be recorded into said signal channels to change the normal bias in each of said amplifier tubes, a voltage generator for generating a voltage whose amplitude varies with time, means to regulate the voltage of said voltage generator so that it passes through the bias voltage of each of said vacuum tube amplifiers during its upsweep to unbias each of said vacuum tube amplifiers at different times and through the bias voltage of each of said vacuum tube amplifiers and through the bias voltage of each of said amplifiers during its downsweep to bias at different times, each of said vacuum tube amplifiers to cutoff, the time of the unbiasing and biasing of each of said vacuum tube amplifiers being determined by the algebraic sum of the said time varying voltage, the normal bias voltage of each of the said amplifiers and the amplitude of the electric signals to be recorded present in said amplifiers, means to electrically connect said voltage to each of said vacuum tube amplifiers, a gas tube connected to each of said amplifiers and biased to fire only when the amplifier tube to which it is connected is cut off, and means to record the time of the firing of each of said gas tubes in relation to the period of the said time varying voltage as an indication of the amplitude of the signals to be recorded.

6. In a device for recording a plurality of electric signals, an electronic circuit including a plurality of input signal channels for the introduction therein of the signals to be recorded, a vacuum tube amplifier in each of said signal channels, each of said tubes being normally biased to cut off but in different voltage amounts, means to introduce said signals to be recorded into said signal channels to change the normal bias in each of said amplifier tubes, a voltage generator for generating a voltage whose amplitude varies with time, means to regulate the voltage of said voltage generator so that it passes through the bias voltage of each of said vacuum tube amplifiers during its upsweep to unbias at different times each of said vacuum tube amplifiers and through the bias voltage of each of said vacuum tube amplifiers during its downsweep, to bias at different times each of said vacuum tube amplifiers to cutoff, the time of the unbiasing and biasing of each of said vacuum tube amplifiers being determined by the algebraic sum of the said time varying voltage, the normal bias voltage of each of the said amplifiers and the amplitude of the electric signals to be recorded present in said amplifiers, means to electrically connect said time varying voltage to each of said vacuum tube amplifiers, a gas tube connected to each of said amplifiers and biased to fire only when the amplifier tube to which it is connected is cut off, a rotating voltage recording means, means for impressing the said electric signals upon the said rotating voltage recording means at a time determined by the firing of each of said gas tubes, means for synchronizing the rotation of the said voltage recording means with the period of the said time varying voltage so that the electric signals to be measured are displaced across the said rotating recording means as the function of the amplitude of the electric signals to be recorded.

ROBERT W. OLSON.

REFERENCES CITED

The following references are of record in the file of this patent:

UNITED STATES PATENTS

| Number | Name | Date |
| --- | --- | --- |
| 2,412,310 | Young | Dec. 10, 1946 |
| 2,457,173 | Newitt | Dec. 28, 1948 |
| 2,465,355 | Cook | Mar. 29, 1949 |